March 8, 1927. P. G. LEONARD Re. 16,568

CLUTCH

Original Filed June 12, 1922 4 Sheets-Sheet 1

Witnesses:
C. E. Threedy
J. D. Stuve

Inventor
Peter Gustaf Leonard
By Joshua R. H. Potts
His Attorney

March 8, 1927.

P. G. LEONARD

CLUTCH

Re. 16,568

4 Sheets-Sheet 2

Original Filed June 12, 1922

Witnesses:
C. E. Threedy
J. D. Stuwe

Inventor
Peter Gustaf Leonard
By Joshua R. H. Potts
His Attorney

March 8, 1927.

P. G. LEONARD

CLUTCH

Re. 16,568

4 Sheets-Sheet 3

Original Filed June 12, 1922

Witnesses:
C. E. Hardy
J. D. Stuve

Inventor
Peter Gustaf. Leonard
By Joshua R. H. Pope
His Attorney

March 8, 1927. P. G. LEONARD Re. 16,568

CLUTCH

4 Sheets-Sheet 4

Original Filed June 12, 1922

Witnesses:
C. E. Grady
J. D. Stuwe

Inventor
Peter Gustaf Leonard.
By Joshua R. H. Pope
His Attorney

Reissued Mar. 8, 1927. Re. 16,568

UNITED STATES PATENT OFFICE.

PETER GUSTAF LEONARD, OF TULSA, OKLAHOMA, ASSIGNOR TO BOVAIRD AND SEYFANG MANUFACTURING COMPANY, OF BRADFORD, PENNSYLVANIA, A CORPORATION OF PENNSYLVANIA.

CLUTCH.

Original No. 1,530,271, dated March 17, 1925, Serial No. 567,727, filed June 12, 1922. Application for reissue filed August 21, 1926. Serial No. 130,741.

My invention relates to new and useful improvements in clutches, and has for its object the provision of a clutch which has the clutch spider or carrier and reverse drum combined in one member, and has its forward and reverse drive mechanism mounted in said drum.

It is desirable in the construction of reversing clutches to shorten as far as possible the length of the mechanism for economy of space but more particularly because such mechanisms are frequently used with an outboard mounting and it is desirable to have the strain as near to the main mounting as possible. This is accomplished in the present invention by putting the entire gearing at the outer end, thus permitting the positioning of the driving pulley directly adjacent to the main bearing. Such construction makes a very much more convenient structure so far as repairs are concerned because the gearing can be readily detached without removing the clutch from the main mounting.

The structure made in accordance with the invention is advantageous in that the spreader or carrier usually used in such devices carries the clutch mechanism and with the clutch shaft rotating, may remain stationary so that the clutch used may be readily adjusted. Such construction also simplifies the arrangement of brake and clutch mechanism in that both operate on the spreader.

Another object is to provide a device which is safe in operation, simple in construction, is easy to assemble or disassemble, and is highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation, showing the position of the members when the clutch shoes are released and the brake-band engages the drum;

Figure 1:
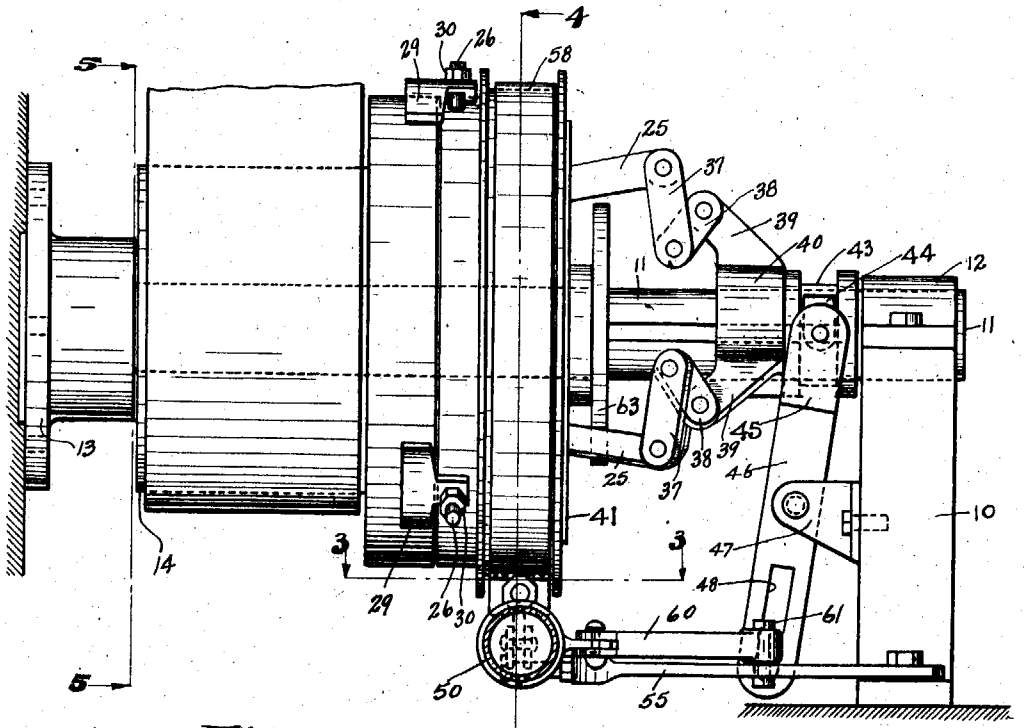
Figure 2:
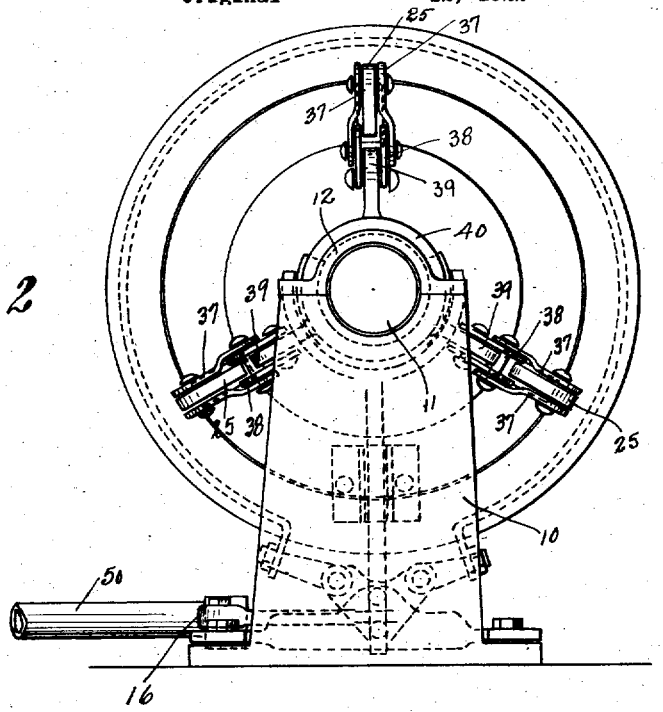
Fig. 2 is an end elevation, showing the brake-band in release position.
Figure 4:
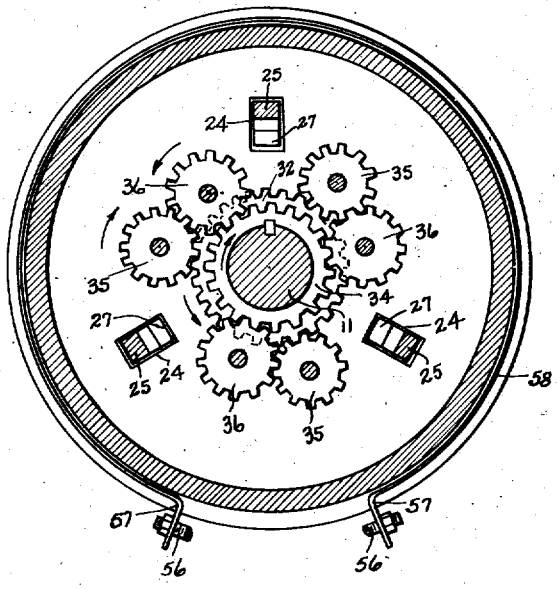
Figure 5:
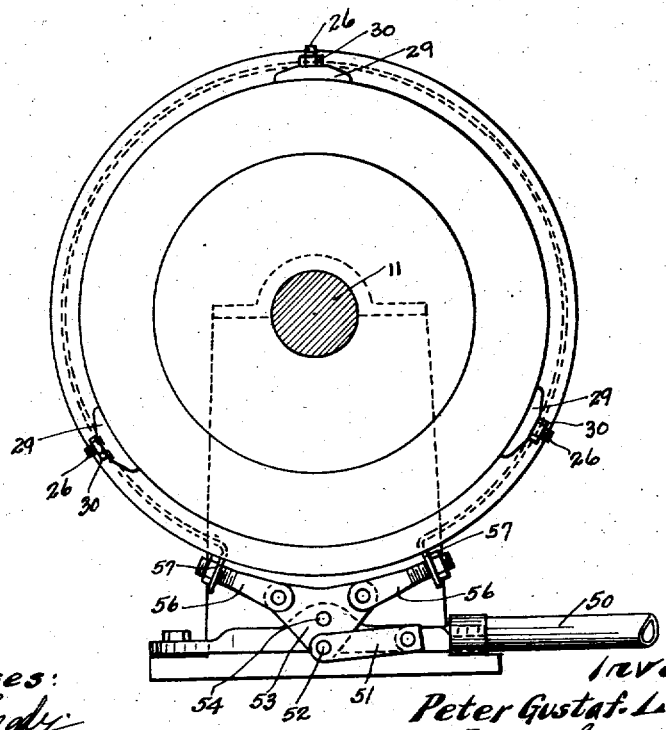
Figure 6:
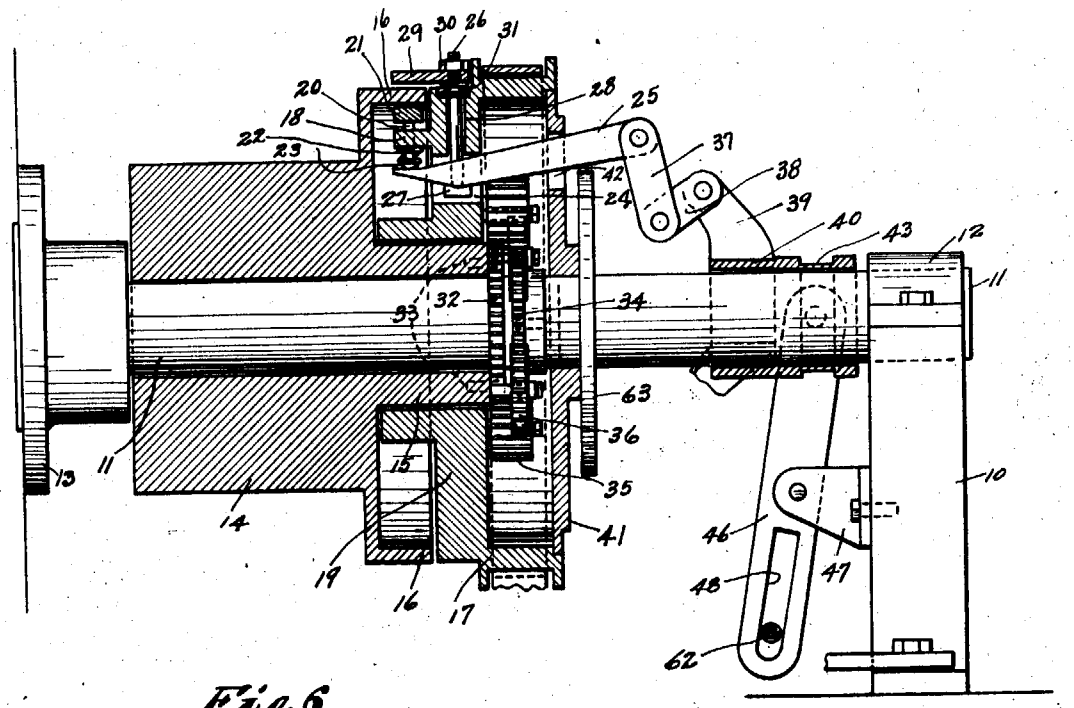

Figs. 4 and 5 are vertical sectional views substantially on line 4—4 and 5—5 of Fig. 1, showing the brake-band in release position, and Fig. 6 is a longitudinal vertical sectional view, showing the members in the same position as in Fig. 1.

The form of construction illustrated comprises a support 10 on the upper end of which is journaled one end of a shaft 11, and a cap 12 is placed over said shaft and fastened to said support. The other end of said shaft has an attaching member 13 rigidly mounted thereon, adapted to be fastened to the balance wheel of an engine (not shown). A pulley 14 is rotatably mounted on said shaft adjacent to the attaching member and is provided with a sleeve 15 and a cylindrical flange 16 beyond the periphery of said sleeve. A carrier or spreader and drum 17 are rotatably mounted on said sleeve and are provided with lugs 18 extending laterally from a radial web 19 of the drum, which extend within the cylindrical flange of the pulley. Pins 20 are mounted in the openings in said lugs, each of said pins carrying a shoe 21 on its outer end adapted to bear on the interior of the cylindrical flange, and having a spring 22 mounted on the inner end, between said lug and a head 23 on said pin. Transverse openings 24 are provided in web 19 of the drum, in each of which a lever 25 operates. A bolt 26 passes through an opening in said lever and has a head 27 bearing on the lever. A bore 28 leads from each opening 24 radially through the web 19, said bolt extends through said bore and has a brake shoe 29 mounted adjacent its free end, outside of the flange 16, said shoe being held in position by a nut 30 on the end of the bolt and a spring 31 seated beneath said shoe and in a seat on the exterior of said drum.

A gear 32 is fastened to the face of the pulley sleeve 15, as by means of screws 33, and a similar gear 34 is keyed to the shaft. Pinions 35 are pivotally mounted on web 19 in mesh with the pulley gear and idlers 36 are also pivoted to said web in mesh with the shaft gear, each idler meshing with one of said pinions.

The lever 25 is connected at its outer end to a pair of links 37 which have a pair of links 38 pivoted between them, which in turn are pivoted to an arm 39 of a collar 40 slidably mounted on the shaft 11. A plurality of these arms, links and levers are provided, and a closing plate 41 seats against the outer rim of the drum, forming a housing therewith for the gears, and contains slots 42 in which the levers 25 operate. A groove 43 is formed around said collar in which operate shoes 44 attached to a yoke 45 of a lever 46, which is pivoted at its middle portion to a bracket 47 fastened to the support 10, and has a slot 48 at its lower end.

An operating member 50 is pivotally connected, by means of a pair of links 51 and a pin 52, to one corner of a triangular plate 53, which is pivotally mounted on a pin 54 fastened on a curved bracket 55 attached to the support 10. Threaded members 56 are pivoted to the other corners of said plate 53 and have their free ends fastened each to an end 57 of a brake band 58 engaging around the drum 17. The member 50 is provided with a side lug 59 to which is pivoted one arm 60 of a bell crank pivoted at 61 to the bracket 55, the other arm 62 of the bell crank engaging in the slot 48. A disc 63 is mounted on said shaft, adjacent the closing plate 41.

Figure 3:
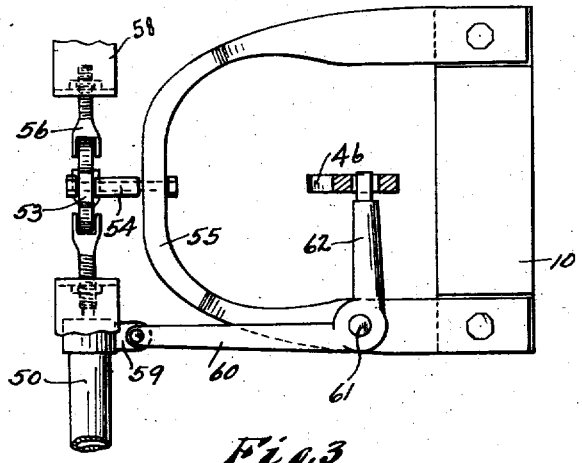
Fig. 3 is a horizontal sectional view taken substantially on line 3—3 of Fig. 1.

In operation the member 50 is thrust forward toward the device which carries the arm 60 of the bell crank forward and moves the free end of the crank arm 62 towards the right, as viewed in Fig. 3, carrying with it the lower part of the lever thereby forcing the sleeve and the toggle inward toward the clutch. This action brings the connected ends of the links 37 and the associated links 38 against the disc 63, the links 38 slanting inward towards said disc. The further inward movement of the collar 40 straightens out these links 38 forcing them in a direction radial to the shaft, thereby drawing the links 37 and the outer ends of the levers 35 inwards toward the shaft. The heads 27 of the bolts 26 will act as fulcrums for the lever forcing the bolts inward and with them the shoes 29 into contact with the flange 16 of the drum, at the same time the inner ends of the levers will force the shoes 21 outwards toward the inside of said flange 16. During said movement of the clutch operating mechanism plate 53 has been partly rotated upon the pin 54, thereby separating the ends 57 of the band 58 and loosening said band upon the drum 17, as shown in Fig. 5. With the members in this position, the clutch spider of the drum engages the flange of the pulley and the drum and pulley rotate together. The gears and pinions mounted on the shaft, pulley and drum will lock the shaft with the pulley and force the shaft to also rotate in unison with the drum and pulley, that is, all members rotate in a forward direction. When the operating member 50 is drawn outwards the collar 40 is drawn away from the drum and toward the support and the clutch members are released from the flange of the pulley. At the same time the plate 53 is partly rotated upon the pin 54 bringing the ends 57 of the brakeband 58 together and thereby tightening said band upon the drum to hold the drum against rotation. The rotation of the pulley will now carry with it its attached gear 32 which will rotate the pinions 35 and through them the idlers 36 meshing with the gear 34 keyed to the shaft. The arrangement of these gears, pinions and idlers will rotate the shaft in a direction reverse to that of the pulley.

It is thus evident that by an inward thrust of the operating member 50 the clutch members become operative and the brake-band is released, and the pulley, drum, shaft and associated members rotate in unison; and that by an outward thrust of the operating member 50 the clutch members are released and the brake-band engages the drum and holds the same, whereupon the pulley and shaft rotate in reverse directions.

It will be noted that when the reversing mechanism is in operation the clutch members are stationary and consequently adjustment thereof may be made by means of the nuts 30. This is a very important feature in that clutches are ordinarily used with explosive engines and the adjustment can thus be made as necessary without stopping the engine.

It will also be observed that the entire belt strain on the pulley is only the fly wheel support and is thus sustained by the engine bearings. Inasmuch as these belts are usually of considerable length and carry the load this construction is preferable. Also by the placing of the driving pulley next to the fly wheel to which the clutch is attached, the gears and operating mechanism are arranged on the outside of the clutch so that they can be readily removed by the removal of the outboard bearing alone.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

What I claim as new is:—

1. A device of the class described comprising a shaft; a pulley with a laterally extending sleeve mounted on said shaft; a drum mounted on said sleeve; a clutch mounted on one end of said drum; a brake means to hold said drum against rotation; a gear fastened on the end of said sleeve; a gear fastened on said shaft adjacent said sleeve gear; a pinion and idler pivoted on said drum and meshing with each other, one meshing with said shaft gear and the other with said pulley gear, for rotating said shaft in a direction reverse to said pulley while said brake means hold said drum; and means to actuate said clutch to engage said pulley to lock said shaft, pulley and drum together.

2. A device of the class described, comprising a shaft; a pulley mounted on said shaft; a drum mounted on said pulley; a peripheral flange on said pulley; a pair of clutch members mounted on said drum to clutch said flange therebetween; toggle means to operate said clutch members; a brake to engage said drum; toggle means to operate said brake; and means to simultaneously actuate both toggle means, to engage said clutch and release said brake or release said clutch and engage said brake.

3. A device of the class described comprising a shaft; a pulley mounted on said shaft; a peripheral flange on said pulley; a drum mounted on said pulley and having a portion extending within said flange; a clutch member mounted on said extension to engage the inside of said flange, a clutch member mounted on said drum to engage the outside of said flange; a lever mounted in said drum for operating both of said clutch members; toggle means to operate said lever and clamp said clutch members on said flange to rotate said pulley and drum together; a brake to engage said drum and stop rotation thereof; and means to release either said brake or said clutch members and tighten the other.

4. A device of the class described comprising a shaft; a pulley mounted on said shaft; a peripheral flange on said pulley; a drum mounted on said pulley having parts extending within said flange; a member slidably mounted in said inwardly extending part and a member slidably mounted in said drum; a pair of shoes mounted on said members for clamping said flange thereby; a lever operatively engaging one of said members and being fulcrumed on the other member; and toggle means to operate said lever and clamp said shoes on said flange for rotating said pulley and drum together.

5. A device of the class described comprising a shaft; a pulley mounted on said shaft; a sleeve extending axially from said pulley; a peripheral flange on said pulley outward of said sleeve; a drum journaled on said sleeve and extending inward of said flange; a clutch member mounted on the inward extension of said drum for engaging the inside of said flange; means movable radially of said drum; a clutch member carried by said means for engaging the outside of said flange; a lever fulcrumed on said means for actuating both of said clutch members to lock said pulley and drum together; gear means mounted within said drum for rotating said shaft and drum in reverse directions; brake means for holding said drum stationary; and means to actuate said lever and said brake means for either locking said pulley and drum together or for rotating said pulley and shaft in reverse directions.

6. A device of the class described comprising a support; a shaft at one end rotatably mounted in said support; a pulley rotatably mounted on said shaft; a drum rotatably mounted on said pulley; clutch means mounted on said drum to engage said pulley for combined rotation of said drum and pulley; means to actuate said clutch means including a lever fulcrumed on said support and toggle mechanism connected to said lever; a brake band for holding said drum; transmission mechanism in said drum for rotating said shaft and pulley in reversed directions while said brake band holds said drum stationary; a bracket mounted on said support; toggle means pivoted on said bracket for actuating said brake band; a bell-crank pivoted on said support for engaging and actuating said lever; and an operating member connected to said bell-crank and to said toggle means for releasing the one and engaging the other of either of said clutch means or said brake band.

7. In a reversing clutch, the combination of a shaft; a spreader journaled on the shaft; a pinion connection on the spreader; a driving gear fixed on the shaft; a driven gear journaled on the shaft, said driving gear being in driving relation with the driven gear through the pinion connection; a clutch mounted on the spreader locking the spreader with the driven gear; a brake locking the spreader; and means for adjusting the clutch, said means being exposed with the clutch assembled and operable with the shaft in operation and while the clutch is released.

8. In a reversing clutch, the combination of a shaft; a spreader journaled on the shaft; a pinion connection mounted on the spreader; a driving gear fixed on the shaft; a driven gear journaled on the shaft, said driving gear being in driving relation with the driven gear through the pinion connection; a clutch mounted on the spreader locking the spreader with the driven gear, said clutch comprising a plurality of radially movable clutch shoes; means actuating the shoes comprising springs acting radially on the shoes for releasing the shoes; means for adjusting the shoes, said means being exposed with the clutch assembled and operable with the shaft in motion and while the shoes are stationary; and a brake locking the spreader.

In testimony whereof I have hereunto set my hand.

PETER GUSTAF LEONARD.